United States Patent [19]

Honda

[11] Patent Number: 4,651,309

[45] Date of Patent: Mar. 17, 1987

[54] FISH SONAR

[76] Inventor: Keisuke Honda, 62-1, Aza Shinsanbongi, Sanbongi-cho, Toyohashi-shi, Aichi-ken, Japan

[21] Appl. No.: 766,633

[22] Filed: Aug. 16, 1985

[51] Int. Cl.$^4$ ............................................. G01S 15/96
[52] U.S. Cl. ..................................... 367/108; 367/115
[58] Field of Search ................ 367/108, 115; 340/850

[56] References Cited

U.S. PATENT DOCUMENTS

| | | | |
|---|---|---|---|
| 3,673,552 | 6/1972 | Mross et al. | 367/108 |
| 4,096,484 | 6/1978 | Ferre et al. | 367/115 |
| 4,122,428 | 10/1978 | Morrow, Jr. | 367/108 |
| 4,205,395 | 5/1980 | Shortridge | 367/115 |

Primary Examiner—Richard A. Farley
Attorney, Agent, or Firm—Burgess, Ryan & Wayne

[57] ABSTRACT

In the fish sonar, the temperature and the hydrogen ion exponent in the sea are recorded or displayed on the recording medium or display of the recording or displaying device with digital echo signals of an ultrasonic wave corresponding to a base line, a school of fish and the bottom in the sea. The fish sonar need not have an exclusive device for measuring temperature and hydrogen ion exponent in the sea.

1 Claim, 3 Drawing Figures

FISH SONAR

BACKGROUND OF THE INVENTION

The present invention relates to a fish sonar for displaying values of the temperature and hydrogen ion exponent in the sea.

Generally, in order to measure the temperature and hydrogen ion exponent in the sea, a fish sonar must have exclusive devices for measuring the temperature and hydrogen ion exponent.

Therefore, the fish sonar having the exclusive devices becomes large and its cost becomes high. Also, the fish sonar cannot be put on a small boat.

SUMMARY OF THE INVENTION

It is, therefore, the primary object of the present invention to provide a fish sonar having means for displaying the water temperature and the hydrogen ion exponent.

In order to accomplish the above and other object, the present invention provides a fish sonar comprising: a transmitting-receiving vibrator for transmitting an ultrasonic wave in the sea when a transmitter outputs a pulse signal and for receiving an echo from objects in the sea, an amplifier for amplifying the echo signal received by the transmitting-receiving vibrator, an A/D converter for converting the echo signal amplified by the amplifier into a digital echo signal, a buffer memory for memorizing the digital echo signal from the A/D converter, a first random access memory for memorizing the digital echo signal from the buffer memory every predetermined number of pulse signals from the transmitter, a memory for memorizing digital echo signals read out from the first random access memory by processing for recording or displaying the digital echo signal, a temperature sensor for detecting the temperature of the sea, a hydrogen ion sensor for detecting the hydrogen ion in the sea, amplifiers for amplifying the outputs from the temperature sensor and the hydrogen ion sensor respectively, a switching device for switching the outputs from the amplifires by turns, an A/D convertor for converting the temperature digital signal and the hydrogen ion digital signal from the switching device, a second random access memory for memorizing the temperature digital signal and the hydrogen ion digital signal, the memory for memorizing the temperature digital signal and the hydrogen ion digital signal from the second memory with the digital echo signal by processing for recording or displaying the temperature digital signal and the hydrogen ion digital signal as a hydrogen ion exponent, and a recording or displaying device for recording or displaying the digital echo signal, the temperature digital signal and the hydrogen ion digital signal.

These and other objects, features and advantages of the invention will become more apparent from the following description taken in connection with the illustrated embodiment of the accompanying drawings.

DESCRIPTION OF THE PREFERRED EMBODIMENT

Figure 1:
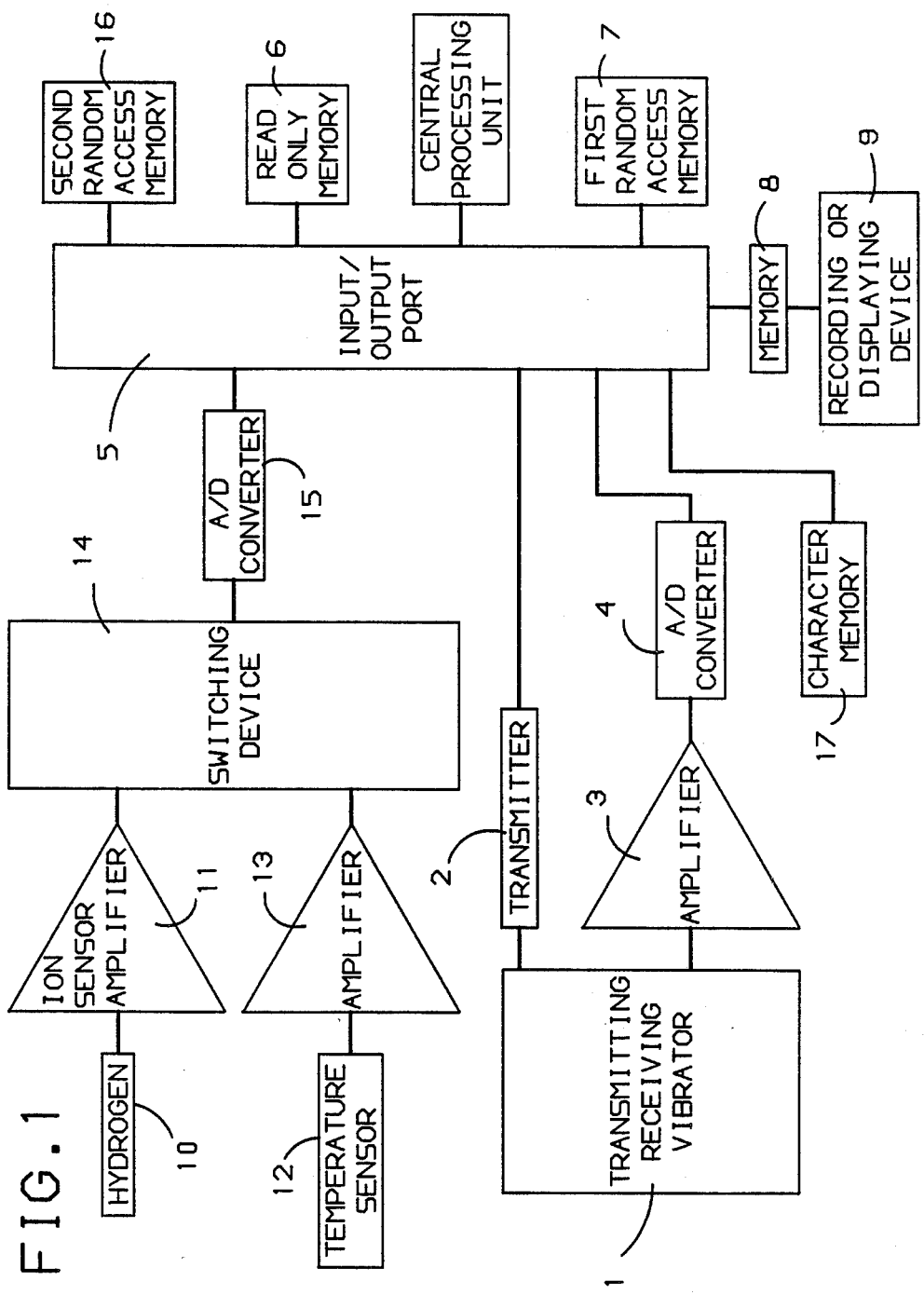
FIG. 1 illustrates a schematic block diagram of an embodiment of the present invention.

Referring to FIG. 1 of the drawing, the output terminal of a transmitter 2 is connected to a transmitting-receiving vibrator 1 which is connected to an amplifier 3. The output terminal of the amplifier 3 is connected to an A/D converter 4. The output terminal of the A/D converter 4 is connected to an input/output port 5. The input/output port 5 is connected to a central processing unit CPU, a read only memory 6, a first random access memory 7, a memory and D/A converter 8 and a character memory 17. The output terminal of the memory 8 is connected to a recording or displaying device 9. Also, the output terminals of a hydrogen ion sensor 10 and a temperature sensor 12 are respectively connected to a switching device 14 through amplifiers 11 and 13. The output terminal of the switching device 14 is connected to the input/output port 5 through an A/D converter 15 and a second random access memory 16 is connected to the input/output port 5.

The mode of the operation of this embodiment will be described with reference to the recording medium or display 18 of the recording or displaying device in FIG. 2 and the flow chart in FIG. 3. When a pulse signal is output from the transmitter 2 to the transmitting-receiving vibrator 1 and the amplifier 3, the ultrasonic wave is emitted from the transmitting-receiving vibrator 1 in the sea. The pulse signal which is applied from the transmitter 2 to the amplifier 3 is amplified and is converted to a digital signal by the A/D converter. Then the digital signal is memorized in the first random access memory 7 as a base line 19 in FIG. 2. The ultrasonic waves emitted in the sea are reflected by a school of fish and the bottom of the sea and are received by the transmitting-receiving vibrator 1 as an echo signal. The echo signal is amplified by the amplifier 3 and is converted to a digital echo signal by A/D converter 4 and the digital signal is memorized in the first random access memory 7, through the input/output port 5 as a signal of a school of fish and the bottom of the sea as shown by the numerals 20 and 21 in FIG. 2.

The digital signal and the digital echo signal are processed by the central processing unit CPU to record or display in the recording or displaying device 9 and are memorized in the memory 8. Then the digital signal and the digital echo signal are read out from the memory 8 and are recorded or displayed in the recording displaying device 9.

The hydrogen ion signal detected by the hydrogen ion sensor 10 and the temperature in the sea detected by the temperature sensor 12 are respectively amplified by the amplifiers 11 and 13 and are input to the A/D converter 15 by the switching device 14 in turn. The hydrogen ion digital signal and the temperature digital signal which are output from the A/D converter 15 are memorized in the second random access memory 16. Then the hydrogen ion exponent is calculated from the hydrogen ion signal in the central processing unit CPU. The hydrogen ion exponent digital signal and the temperature digital signal are processed by the central processing unit CPU to record or display in the recording or displaying device 9 and are memorized in the memory 8. Then the hydrogen ion exponent digital signal and the temperature digital signal are read out from the memory 8 and are recorded and displayed in the recording or displaying device 9 with the digital signal and the digital echo signal as shown by reference numerals 22 and 23 in FIG. 2.

Figure 2:
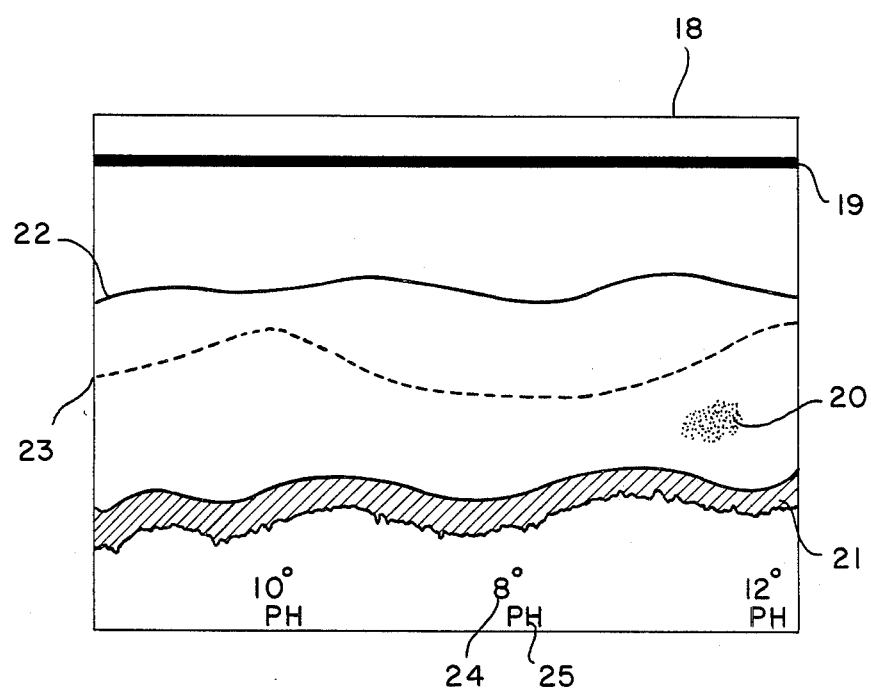
FIG. 2 illustrates a recording medium or display in the recording or displaying device of FIG. 1.
Figure 3:
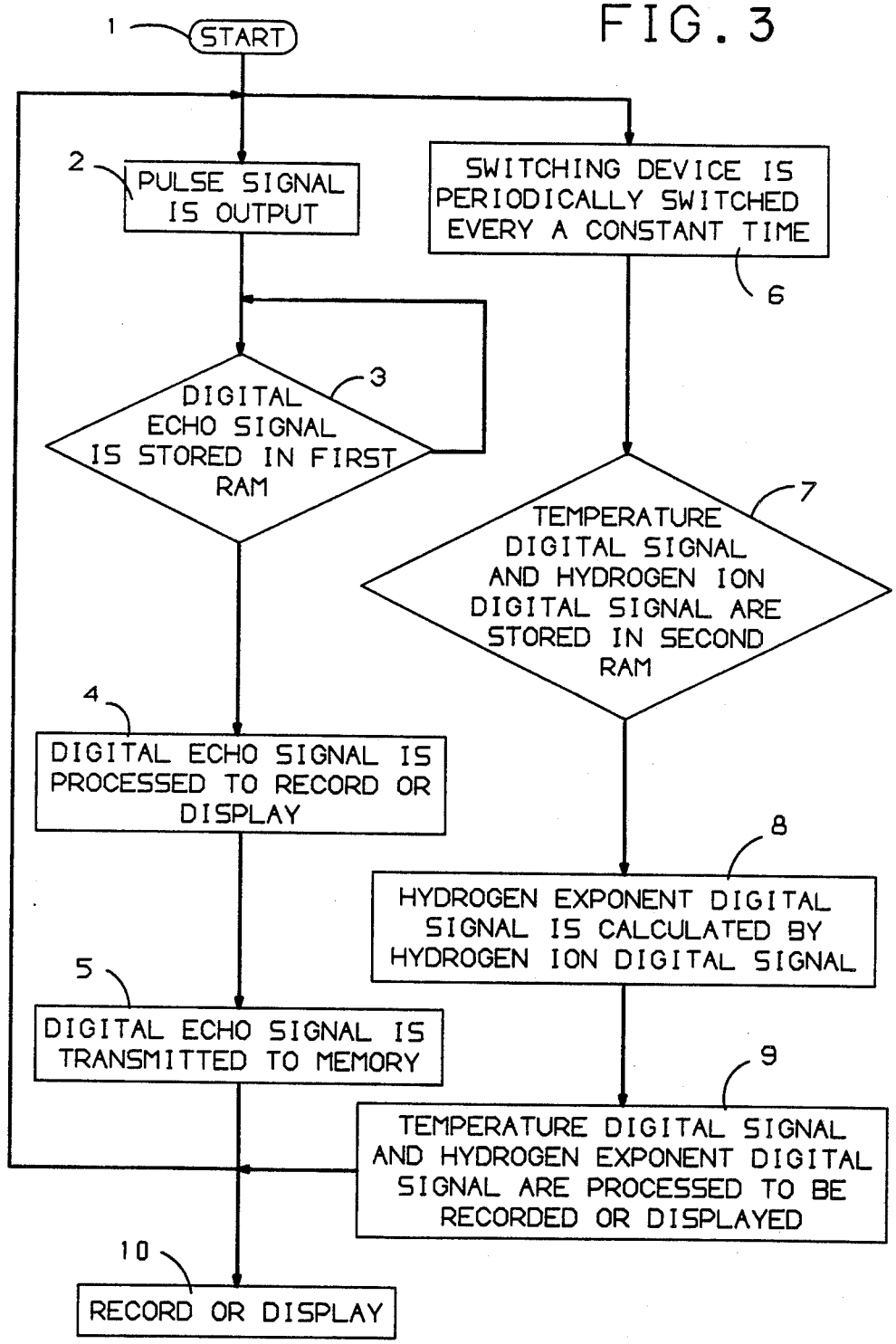
FIG. 3 shows a flow chart for explaining the motion of the fish sonar of FIG. 1.

When the hydrogen ion exponent digital signal and the temperature digital signal are memorized in the memory 8, the numerals and characters corresponding to the values of the hydrogen ion exponent digital signal and the temperature signal are read out from the character memory 17 and memorized in the memory 8, whereby the numerals and characters are recorded or displayed on the recording medium or the display as shown in 24 and 25 of FIG. 2.

What is claimed is:

1. A fish sonar comprising: a transmitting-receiving vibrator for transmitting an ultrasonic wave in the sea when a transmitter outputs a pulse signal and for receiving an echo from objects in the sea, an amplifier for amplifying the echo signal received by the transmitting-receiving vibrator, an A/D converter for converting the echo signal amplified by the amplifier into a digital echo signal, a buffer memory for memorizing the digital echo signal from the A/D converter, a first random access memory for memorizing the digital echo signal from the buffer memory for every predetermined number of pulse signals from the transmitter, a processing memory for memorizing digital echo signals read out from the first random access memory for processing by recording or displaying the digital echo signal, a temperature sensor for detecting the temperature of the sea and producing a temperature signal in response thereto, a hydrogen ion sensor for detecting the hydrogen ion in the sea and producing a hydrogen ion signal in response thereto, amplifiers for amplifying the temperature and hydrogen ion signals from the temperature sensor and the hydrogen ion sensor respectively, a switching device for switching the outputs from the amplifiers in turn, an A/D converter for converting the temperature signal and the hydrogen ion signal to respective digital signals, a second random access memory for memorizing the temperature digital signal and the hydrogen ion digital signal, a character memory for storing numerals and characters corresponding to the detected temperature and hydrogen ion in the sea in response to the temperature digital signal and hydrogen digital signal, the processing memory also memorizing the temperature digital signal and the hydrogen ion digital signal from the second memory, and numerals and characters corresponding thereto from the character memory, with the digital echo signal for processing by recording or displaying the temperature digital signal and the hydrogen ion digital signal as a hydrogen ion exponent, and a recording or displaying device for simultaneously recording or displaying the echo signal, the temperature signal, the hydrogen ion signal, and numerals and characters corresponding to the temperature and the hydrogen ion exponent on a single recording medium or display of the recording or displaying device.

* * * * *